(12) United States Patent
Yao et al.

(10) Patent No.: US 12,490,258 B2
(45) Date of Patent: Dec. 2, 2025

(54) TRANSMIT POWER CONTROL (TPC) FOR UPLINK TRANSMISSIONS DURING A TIME DOMAIN WINDOW (TDW)

(71) Applicant: Apple Inc., Cupertino, CA (US)

(72) Inventors: Chunhai Yao, Beijing (CN); Dawei Zhang, Cupertino, CA (US); Chunxuan Ye, San Diego, CA (US); Haitong Sun, Cupertino, CA (US); Oghenekome Oteri, San Diego, CA (US); Hong He, Cupertino, CA (US); Seyed Ali Akbar Fakoorian, San Diego, CA (US); Wei Zeng, Cupertino, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 18/124,449

(22) Filed: Mar. 21, 2023

(65) Prior Publication Data

US 2023/0345470 A1    Oct. 26, 2023

Related U.S. Application Data

(60) Provisional application No. 63/333,911, filed on Apr. 22, 2022.

(51) Int. Cl.
*H04W 72/1268* (2023.01)
*H04W 52/54* (2009.01)
*H04W 72/232* (2023.01)

(52) U.S. Cl.
CPC ....... *H04W 72/1268* (2013.01); *H04W 52/54* (2013.01); *H04W 72/232* (2023.01)

(58) Field of Classification Search
None
See application file for complete search history.

(56) References Cited

U.S. PATENT DOCUMENTS

2022/0279455 A1*  9/2022  Cozzo .................. H04W 52/08
2024/0364475 A1* 10/2024  Li ....................... H04L 25/0204

* cited by examiner

*Primary Examiner* — Kouroush Mohebbi
(74) *Attorney, Agent, or Firm* — Sterne, Kessler, Goldstein & Fox P.L.L.C.

(57) ABSTRACT

A user equipment (UE) is provided to implement a set of transmit power control (TPC) commands during a time domain window (TDW) including multiple physical uplink shared channel (PUSCH) transmissions. The UE can receive a configuration from the base station to configure the UE to support a power control mode and a timeline measurement related to a PUSCH transmission. The UE can receive a set of TPC commands during the TDW, determine whether a TPC command of the set of TPC commands satisfies a time constraint based on the timeline measurement, determine an effective TPC command for the set of TPC commands based on one or more TPC commands satisfying the time constraint, determine an effective delay for the effective TPC command based on the timeline measurement, and further apply the effective TPC command to a PUSCH transmission determined based on the effective delay of the effective TPC command.

20 Claims, 10 Drawing Sheets

TRANSMIT POWER CONTROL (TPC) FOR UPLINK TRANSMISSIONS DURING A TIME DOMAIN WINDOW (TDW)

CROSS-REFERENCE TO RELATED APPLICATIONS

The present application claims the benefit of U.S. Provisional Patent Application No. 63/333,911, filed on Apr. 22, 2022, which is hereby incorporated by reference in its entirety.

BACKGROUND

Field

The described aspects generally relate to wireless communication systems, including the transmit power control (TPC) for uplink transmissions for a user equipment (UE) during a time domain window (TDW).

Related Art

A wireless communication system can include a fifth generation (5G) system, a New Radio (NR) system, a long term evolution (LTE) system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), and enhanced vehicle to anything communications (eV2X). For a wireless communication system, transmit power control (TPC) or sometimes called dynamic power control (DPC) is a mechanism used to reduce the power of a radio transmitter to the necessary level while maintaining the link with a certain quality. TPC can be used to avoid interference into other devices and/or to extend the battery life. Implementation of TPC commands can have various challenges.

SUMMARY

Some aspects of this disclosure relate to apparatuses and methods for a user equipment (UE) to implement a set of transmit power control (TPC) commands during a time domain window (TDW) that includes a plurality of physical uplink shared channel (PUSCH) transmissions. A TDW can be configured by the network. Within a TDW, a UE may be expected to maintain power consistency and phase continuity among multiple PUSCH transmissions. The implemented techniques can be applicable to many wireless systems, e.g., a wireless communication system based on 3rd Generation Partnership Project (3GPP) release 15 (Rel-15), release 16 (Rel-16), release 17 (Rel-17), or others.

Some aspects of this disclosure relate to a UE. The UE can include a transceiver configured to enable wireless communication over a wireless network with a base station, and a processor communicatively coupled to the transceiver. The processor can be configured to receive a configuration from the base station to configure the UE to support a power control mode and a timeline measurement related to a PUSCH transmission. The processor can be further configured to transmit a first PUSCH transmission during a TDW that includes a plurality of PUSCH transmissions, and receive a set of TPC commands during the TDW. In some embodiments, the set of TPC commands can include a TPC command scheduled by a downlink control information (DCI) for a group of UEs including the UE, or a TPC command scheduled by a physical downlink control channel (PDCCH) for the UE. In some embodiments, the power control mode can be configured as an accumulate power control mode or an absolute power control mode. In some embodiments, the timeline measurement can be determined based on a separation between two adjacent PUSCH transmissions within the TDW, between a physical downlink control channel (PDCCH) and a PUSCH transmission next to the PDCCH and scheduled by the PDCCH, or between a PUSCH transmission and a time instance configured by a configured grant of the PUSCH transmission. In some embodiments, the processor can be configured to report to the base station a capability of the UE in supporting the timeline measurement related to a PUSCH transmission.

According to some aspects, the processor can further be configured to determine whether a TPC command of the set of TPC commands satisfies a time constraint based on the timeline measurement, determine an effective TPC command for the set of TPC commands based on one or more TPC commands satisfying the time constraint, and further determine an effective delay for the effective TPC command based on the timeline measurement. Furthermore, the processor can be configured to apply the effective TPC command to a second PUSCH transmission determined based on the effective delay of the effective TPC command.

According to some aspects, when the power control mode is the accumulate power control mode, the effective TPC command can include a new TPC command equivalent to an accumulation of all TPC commands in the set of TPC commands satisfying the time constraint, and the second PUSCH transmission can be within a subsequent TDW after the TDW. In some embodiments, when the power control mode is the accumulate power control mode, the TPC command is scheduled by a downlink control information (DCI) for a group of UEs including the UE, the first PUSCH transmission is of a configured grant type, the first PUSCH transmission can be in a first actual TDW, and the second PUSCH transmission can be in a second actual TDW within the TDW.

In some embodiments, when the power control mode is configured as the accumulate power control mode, the TPC command is scheduled by a physical downlink control channel (PDCCH) for the UE, the first PUSCH transmission is of configured grant type without uplink grant, and the second PUSCH transmission is outside the TDW. In some embodiments, when the power control mode is the absolute power control mode, the effective TPC command can include a TPC command of the set of TPC commands received at a latest time and satisfying the time constraint, and the second PUSCH transmission can be outside the TDW.

In some embodiments, when the power control mode is configured as the accumulate power control mode, the first PUSCH transmission is of a dynamic grant type, the effective TPC command for the set of TPC commands can include a new TPC command equivalent to an accumulation of all the TPC commands in the set of TPC commands satisfying the time constraint, and the second PUSCH transmission can be outside the TDW.

According to some aspects, when the power control mode is the accumulate power control mode, the TPC command is scheduled by a downlink control information (DCI) for a group of UEs including the UE, and the effective TPC command for the set of TPC commands can be determined without considering the DCI scheduled TPC command.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
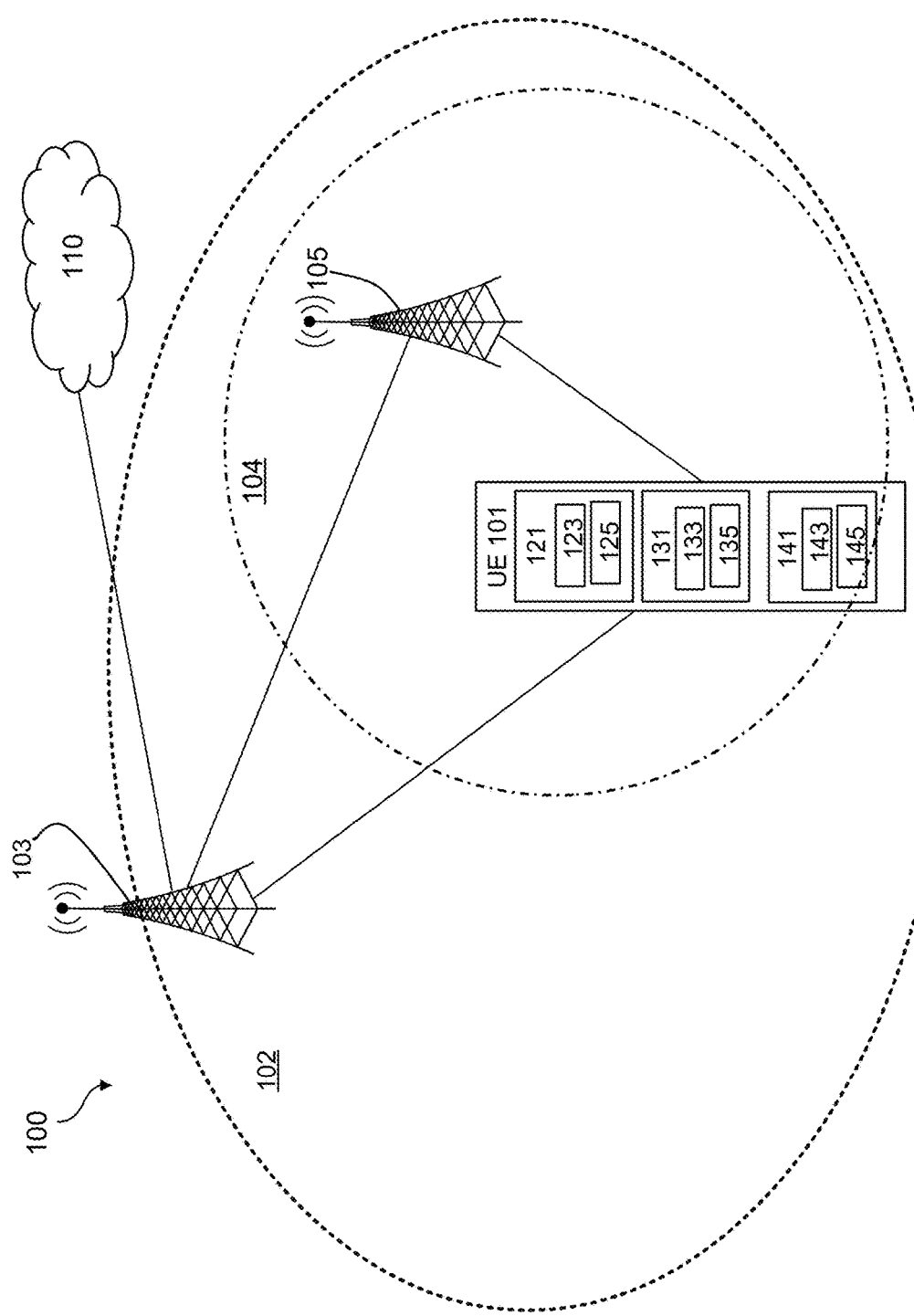
FIG. 1 illustrates a wireless system including a user equipment (UE) to implement a set of transmit power control (TPC) commands during a time domain window (TDW), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

With the development of mobile communication networks, some wireless systems, such as fifth-generation (5G) networks, may adopt higher frequency bands, resulting in higher propagation loss, weaker diffraction capability, and limited and shortened coverage. As the frequency band increases, the difference between uplink and downlink coverage becomes more obvious, and uplink coverage is more restricted. Accordingly, uplink coverage enhancement technology may be used to improve the coverage and performance of such wireless networks.

According to some aspects, one such uplink coverage enhancement technology may be demodulation reference signal (DMRS) bundling. In a conventional wireless system, a channel estimation used for data demodulation is based on DMRS symbols in a slot. There is usually no consistency requirement for DMRS symbols in different time slots or repeated transmission of DMRS symbols. With DMRS bundling technique, there can be additional DMRS symbols in a slot or multiple time slots. The UE can send the same or coherent DMRS symbols in multiple time slots, which may form a time domain window (TDW) that includes a plurality of physical uplink shared channel (PUSCH) transmissions. In some embodiments, a PUSCH transmission among the plurality of PUSCH transmissions can be referred as a PUSCH repetition as well. The DMRS symbols sent in different time slots may have power consistency and phase continuity, which is called DMRS bundling. Within a TDW, a UE may be expected to maintain power consistency and phase continuity among PUSCH transmissions or repetitions so that uplink coverage enhancement technology such as DMRS bundling can be implemented.

According to some aspects, transmit power control (TPC) is a mechanism used to control the power of a radio transmitter for wireless transmission to avoid interference into other devices and/or to extend the battery life. In some embodiments, during a TDW, there can be multiple PUSCH transmissions, and a set of TPC commands received to control the PUSCH transmissions. A TPC command can be scheduled by a downlink control information (DCI) for a group of UEs including the UE, or scheduled by a physical downlink control channel (PDCCH) for the UE only without being applied to other UEs. Implementation of TPC commands within a TDW can be a challenge.

In some embodiments, a UE can be configured to receive a configuration from the base station to configure the UE to support a power control mode and a timeline measurement related to a PUSCH transmission. The UE can be further configured to transmit a first PUSCH transmission during a TDW that includes a plurality of PUSCH transmissions, and receive a set of TPC commands during the TDW. In some embodiments, the power control mode can be configured as an accumulate power control mode or an absolute power control mode. In some embodiments, the timeline measurement can be determined based on a separation between two adjacent PUSCH transmissions within the TDW, between a physical downlink control channel (PDCCH) and a PUSCH transmission next to the PDCCH and scheduled by the PDCCH, or between a PUSCH transmission and a time instance configured by a configured grant of the PUSCH transmission.

Embodiments herein can determine an effective TPC command for the set of TPC commands based on one or more TPC commands satisfying the time constraint. In some embodiments, the effective TPC command can be selected from the set of TPC commands as received. In some other embodiments, the effective TPC command can be a new TPC command that is equivalent to an accumulation of all TPC commands in the set of TPC commands satisfying a time constraint. The effective TPC command may have an effective delay determined based on the timeline measurement. The UE may apply the effective TPC command to a second PUSCH transmission determined based on the effective delay of the effective TPC command.

FIG. 1 illustrates a wireless system 100 including a UE 101 to implement a set of TPC commands during a TDW, according to some aspects of the disclosure. Wireless system 100 is provided for the purpose of illustration only and does not limit the disclosed aspects. Wireless system 100 can include, but is not limited to, UE 101, a base station 103, and a base station 105, all communicatively coupled to a core network 110. There can be other network entities, e.g., network controller, a relay station, not shown. A wireless system can be referred to as a wireless network, a wireless communication system, or some other names known to a person having ordinary skill in the art. In some wireless systems, there may be only one base station 103 serving UE 101 instead of base station 103 and base station 105.

In some examples, wireless system 100 can be a NR system, a LTE system, a 5G system, or some other wireless system. In addition, wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103, or base station 105 can be a fixed station or a mobile station. Base station 103, or base station 105 can also be called other names, such as a base transceiver system (BTS), an access point (AP), a transmission/reception point (TRP), an evolved NodeB (eNB), a next generation node B (gNB), a 5G node B (NB), or some other equivalent terminology.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103 can provide wireless coverage for a cell 102, while base station 105 can provide wireless coverage for a cell 104 contained within cell 102. In some other embodiments, cell 102 can overlap partially with cell 104. Cell 102 and cell 104 can be a macro cell, a pico cell, a femto cell, and/or another type of cell. For comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 can be a macro cell, while cell 104 can be a pico cell or a femto cell. In addition, cell 102 can be a pico cell, while cell 104 can be a femto cell. In some examples, the geographic area of a cell can move according to the location of a mobile base station. In some examples, base station 103 and base station 105 can be interconnected to one another and/or to other base station or network nodes in a network through various types of backhaul interfaces such as a direct physical connection, a virtual network, and/or the like, not shown. In some embodiments, wireless system 100 can be a wireless system having carrier aggregation. Cell 102 can be a primary cell, while cell 104 can be a secondary cell to UE 101. There can be other kinds of cells, such as primary secondary cell, not shown in FIG. 1.

Figure 2:
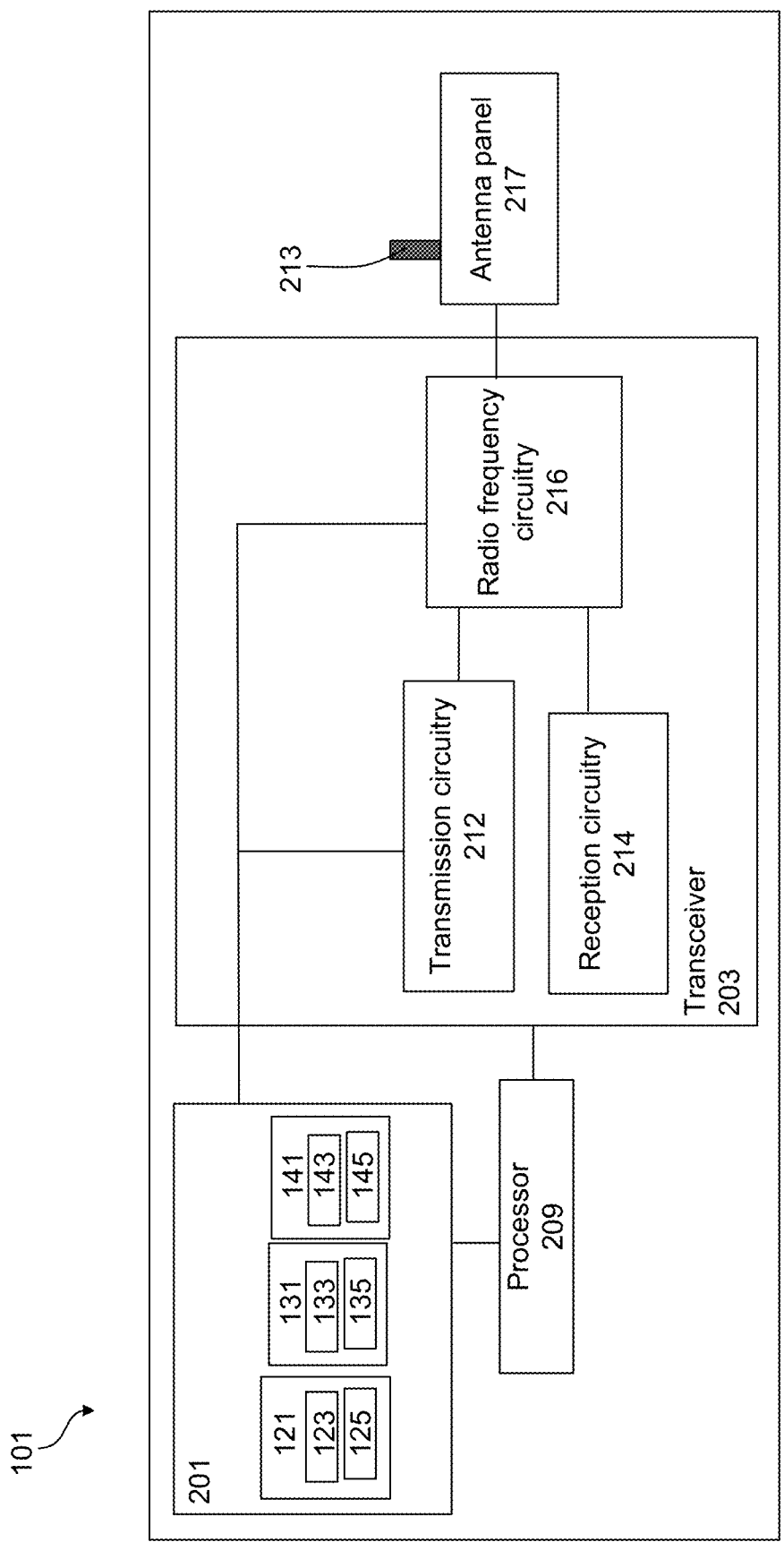
FIG. 2 illustrates a block diagram of a UE including a transceiver and a processor, according to some aspects of the disclosure.

According to some aspects, UE 101 can be implemented according to a block diagram as illustrated in FIG. 2. Referring to FIG. 2, UE 101 can have antenna panel 217 including one or more antenna elements to form various transmission beams, e.g., transmission beam 213, coupled to a transceiver 203 and controlled by a processor 209. Transceiver 203 and antenna panel 217 (using transmission beam 213) can be configured to enable wireless communication in a wireless network. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory 201, which are further coupled to the transceiver 203. Various data can be stored in memory 201.

In some examples, memory 201 can store a configuration 121 that may include a power control mode 123 and a timeline measurement 125 related to a PUSCH transmission. Configuration 121 may be received from base station 103 to configure UE 101 to support power control mode 123 and timeline measurement 125. In addition, memory 201 can store a set of TPC commands 131, which can include an effective TPC command 133 for the set of TPC commands, and an effective delay 135 for effective TPC command 133 based on timeline measurement 125. Memory 201 can store information about a TDW 141, and multiple PUSCH transmissions, e.g., PUSCH transmission 143 and PUSCH transmission 145 transmitted to base station 101 during TDW 151.

In some embodiments, the set of TPC commands 131 can include a TPC command scheduled by a DCI for a group of UEs including UE 101, or a TPC command scheduled by a PDCCH for UE 101. In some embodiments, power control mode 123 can be configured as an accumulate power control mode or an absolute power control mode. In some embodiments, the timeline measurement 125 can be determined based on a separation between two adjacent PUSCH transmissions within the TDW, between a PDCCH and a PUSCH transmission next to the PDCCH and scheduled by the PDCCH, or between a PUSCH transmission and a time instance configured by a configured grant of the PUSCH transmission. In some embodiments, processor 209 can be configured to report to base station 101 a capability of UE 101 in supporting timeline measurement 125 related to a PUSCH transmission.

Figure 3:
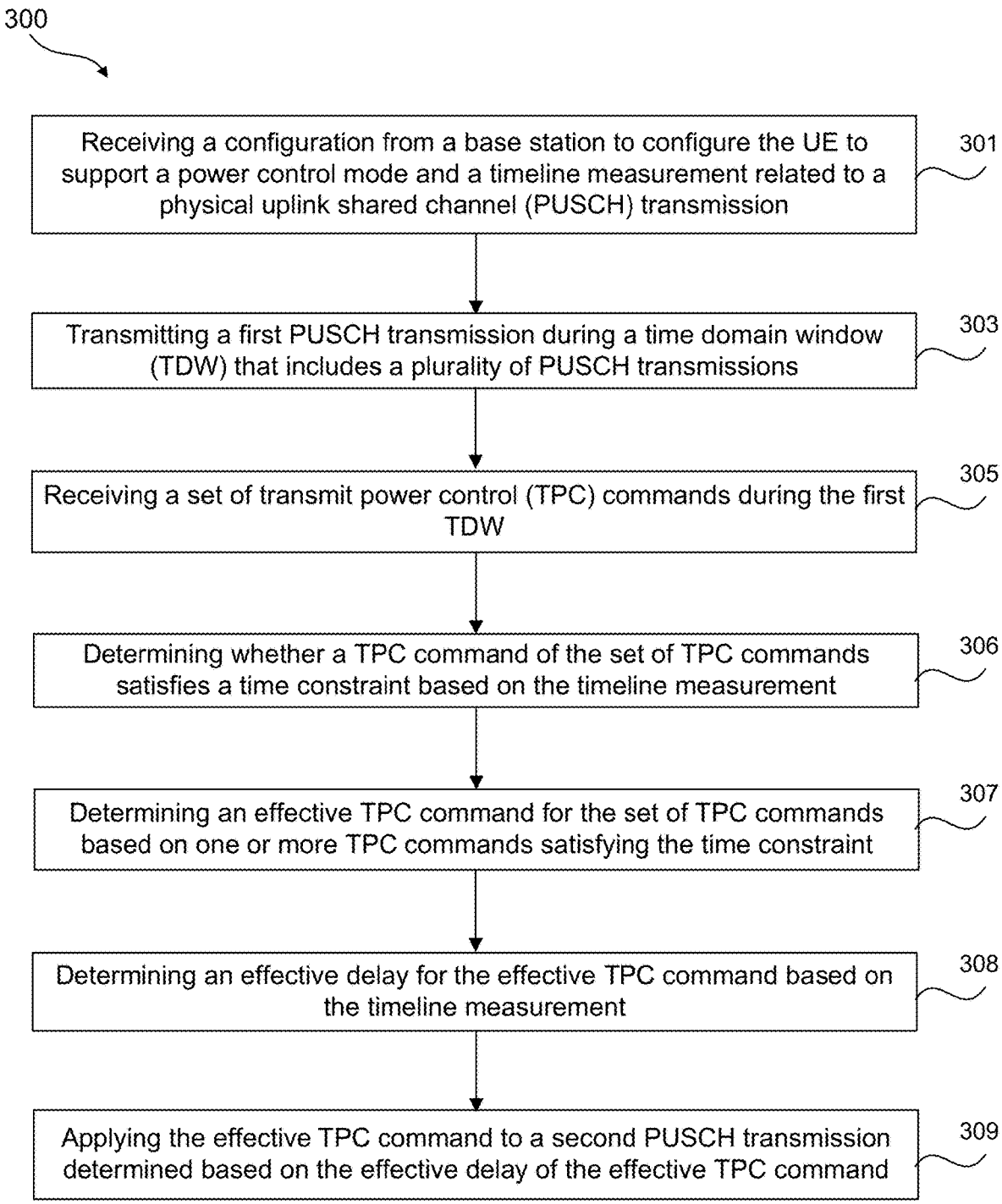
FIG. 3 illustrates an example process performed by a UE for implementing a set of TPC commands during a TDW, according to some aspects of the disclosure.

In some embodiments, memory 201 can include instructions, that when executed by the processor 209 perform operations described herein, e.g., operations described in process 300 in FIG. 3 for implementing the set of TPC commands 131 during TDW 141. Alternatively, the processor 209 can be "hard-coded" to perform the uplink transmission beam selection functions described herein.

FIG. 3 illustrates process 300 performed by a UE for implementing a set of TPC commands during a TDW, according to some aspects of the disclosure. According to some aspects, as shown in FIG. 3, process 300 can be performed by UE 101 or processor 209.

At 301, UE 101 can receive a configuration from a base station to configure the UE to support a power control mode and a timeline measurement related to a PUSCH transmission. For example, as shown in FIG. 1, UE 101 can receive configuration 121 from base station 103 to configure UE 101 to support power control mode 123 and timeline measurement 125 related to a PUSCH transmission. More details of examples for timeline measurement 125 are shown in FIGS. 4A-4F.

At 303, UE 101 can transmit a first PUSCH transmission during a TDW that includes a plurality of PUSCH transmissions. For example, as shown in FIG. 1, UE 101 can transmit PUSCH transmission 143 during TDW 141 that includes a plurality of PUSCH transmissions. More details of examples for a TDW including multiple PUSCH transmissions are shown in FIGS. 4A-4F.

At 305, UE 101 can receive a set of TPC commands during the TDW. For example, as shown in FIG. 1, UE 101 can receive the set of TPC commands 131 during TDW 141. More details of examples for a set of TPC commands received during a TDW are shown in FIGS. 4A-4F.

At 306, UE 101 can determine whether a TPC command of the set of TPC commands satisfies a time constraint based on the timeline measurement. For example, as shown in FIG. 1, UE 101 can determine whether a TPC command of the set of TPC commands 131 satisfies a time constraint based on timeline measurement 125. More details of examples for determining a TPC command satisfying a time constraint based on the timeline measurement are shown in FIGS. 4A-4F.

At 307, UE 101 can determine an effective TPC command for the set of TPC commands based on one or more TPC commands satisfying the time constraint. For example, as shown in FIG. 1, UE 101 can determine effective TPC command 133 for the set of TPC commands 131 based on one or more TPC commands satisfying the time constraint. More details of examples for determining an effective TPC command for the set of TPC commands are shown in FIGS. 4A-4F.

At 308, UE 101 can determine an effective delay for the effective TPC command based on the timeline measurement. For example, as shown in FIG. 1, UE 101 can determine effective delay 135 for effective TPC command 133 based on timeline measurement 125. More details of examples for determining an effective delay for the effective TPC command based on the timeline measurement are shown in FIGS. 4A-4F.

At 309, UE 101 can apply the effective TPC command to a second PUSCH transmission determined based on the effective delay of the effective TPC command. For example, as shown in FIG. 1, UE 101 can apply effective TPC command 133 to PUSCH transmission 145 determined based on effective delay 135 of effective TPC command 133. More details of examples for applying the effective TPC command to a second PUSCH transmission determined based on the effective delay of the effective TPC command are shown in FIGS. 4A-4F.

FIGS. 4A-4F illustrate example implementations performed by UE 101 for implementing a set of TPC commands during a TDW, according to some aspects of the disclosure.

Figure 4A:
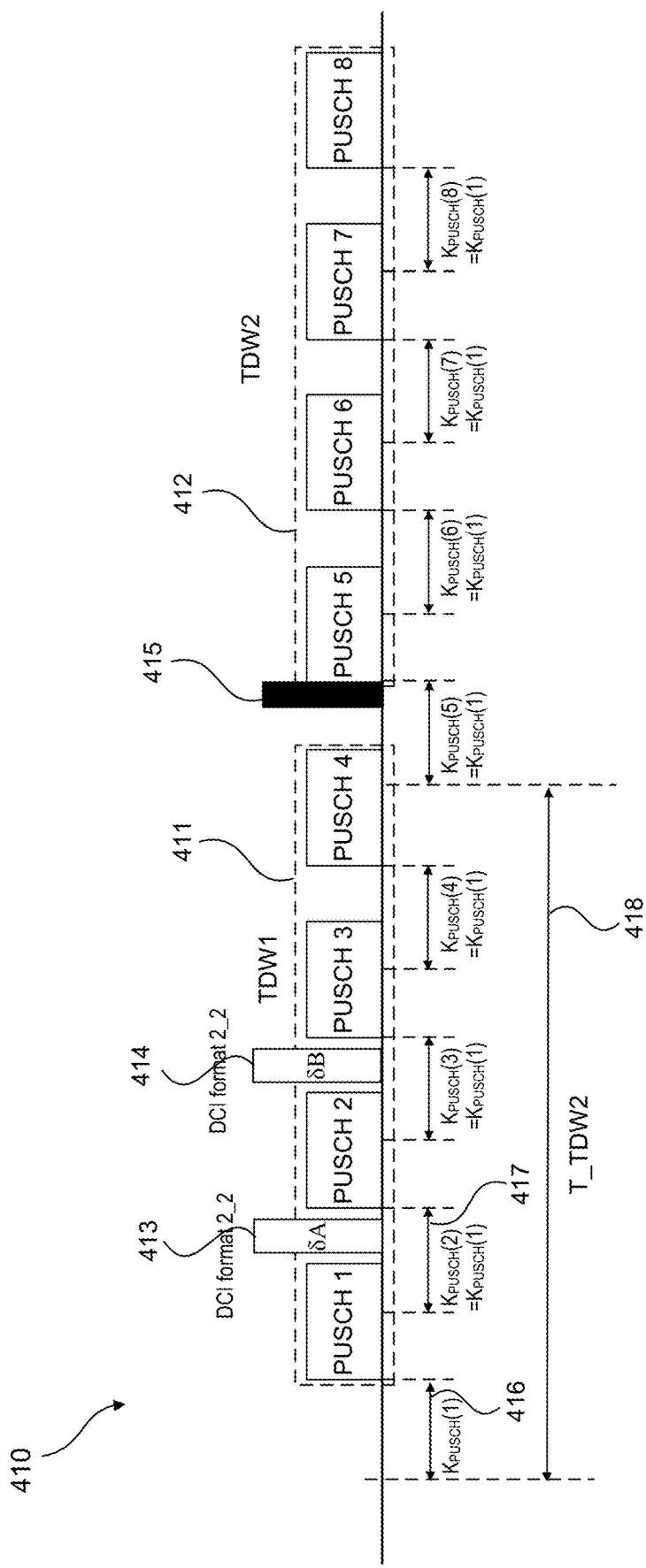
FIGS. 4A-4F illustrate example implementations performed by a UE for implementing a set of TPC commands during a TDW, according to some aspects of the disclosure.

FIG. 4A shows an example implementation performed by UE 101 for implementing a set of TPC commands during a TDW 411. TDW 411 includes PUSCH1, PUSCH2, PUSCH3, and PUSCH4. PUSCH1 may be referred to as the first repetition of TDW 411, PUSCH2 as the second repetition of TDW 411, PUSCH3 as the third repetition of TDW 411, and PUSCH4 as the fourth repetition of TDW 411. TDW 412 is a subsequent TDW after TDW 411, and includes PUSCH5, PUSCH6, PUSCH7, and PUSCH8. In some embodiments, PUSCH1, PUSCH2, PUSCH3, and PUSCH4, PUSCH5, PUSCH6, PUSCH7, and PUSCH8 can be configured grant PUSCH, such as PUSCH configured grant type 1, without uplink (UL) grant. Hence, TDW 411 and TDW 412 can be referred to as a configured TDW.

In some embodiments, a set of TPC commands can include a TPC command 413 ($\delta_A$) and a TPC command 414 ($\delta_B$), both are scheduled by a DCI for a group of UEs including UE 101. In some embodiments, TPC command 413 or TPC command 414 is scheduled by a DCI of DCI format 2_2, which can be referred as a group common TPC command.

In some embodiments, UE 101 can be configured as the accumulate power control mode. An effective TPC command 415 for the set of TPC commands within TDW 411, which includes TPC command 413 and TPC command 414, can be a new TPC command equivalent to an accumulation of all TPC commands in the set of TPC commands satisfying the time constraint. For example, if TPC command 413 indicates to increase the power of UE 101 by 3 db, and TPC command 414 indicates to increase the power of UE 101 by 2 db, the effective TPC command 415 for TPC command 413 and TPC command 414 would be to increase the power for the UE by 5 db=3 db+2 db.

In some embodiments, UE 101 can accumulate TPC commands without taking effect during the current configured TDW. Hence, TPC command 413 and TPC command 414 do not take effect within TDW 411. Accordingly, the effective TPC command 415 take effect after the current configured TDW 411 if the TPC commands satisfy the TPC application timeline of the first transmission after the TDW. Hence, the effective TPC command 415 can take effect during TDW 412 that is a subsequent TDW after TDW 411, and is applied to PUSCH5, PUSCH6, PUSCH7, and PUSCH8 within TDW 412.

In some embodiments, for PUSCH transmissions of PUSCH configured grant type 1, without UL grant, a timeline measurement 416 related to a PUSCH transmission can be denoted as $K_{PUSCH}(1)$, which is a time difference between a beginning symbol of a PUSCH transmission and a time instance configured by a configured grant of the PUSCH transmission. Timeline measurement 416 can be used to determine the TPC command application timeline, e.g., which slot the TPC command is going to be applied to. Such timeline measurement 416 can follow the same guideline in the Rel-15 for the configured grant timeline. In some embodiments, $K_{PUSCH}(1)$ can be a number of $K_{PUSCH}$, min symbols equal to a product of a number of symbols per slot, which can be 14 symbols, and a minimum of the values provided by K2 in PUSCH-ConfgCommon, e.g., $K_{PUSCH}(1) = K2*14$ symbols. In addition, a timeline measurement 417 can be determined based on a separation between two adjacent PUSCH transmissions within the TDW, e.g., between a middle symbol of PUSCH1 and a beginning symbol of PUSCH2, shown as $K_{PUSCH}(2)$. Similarly, $K_{PUSCH}(x)$ can be defined for x=3, 4, 5, 6, 7, 8. In some embodiments, $K_{PUSCH}(x)$ can be equal to $K_{PUSCH}(1)$.

In some embodiments, TDW 411 is followed by TDW 412, TPC command 413 ($\delta_A$) and TPC command 414 ($\delta_B$) are received in TDW 4111 but will not apply in TDW 411. In addition, TPC command 413 ($\delta_A$) or TPC command 414 ($\delta_B$) satisfies a time constraint based on the timeline measurement such as $K_{PUSCH}(4)$ and $K_{PUSCH}(5)$. For example, both TPC command 413 ($\delta_A$) and TPC command 414 ($\delta_B$) are received within an accumulation window 418, represented by T_TDW2, which starts from $K_{PUSCH}(1)$ for TDW 411 to $K_{PUSCH}(5)$ of TDW 412. Accordingly, the effective TPC command 415 equivalent to the accumulation of TPC command 413 ($\delta_A$) and TPC command 414 ($\delta_B$) can be applied in TDW 412 to PUSCH5, PUSCH6, PUSCH7, and PUSCH8. The effective delay of the effective TPC command 415 can be defined as a time difference between PUSCH5 and a reference time point, such as an end point of accumulation window 418.

Figure 4B:
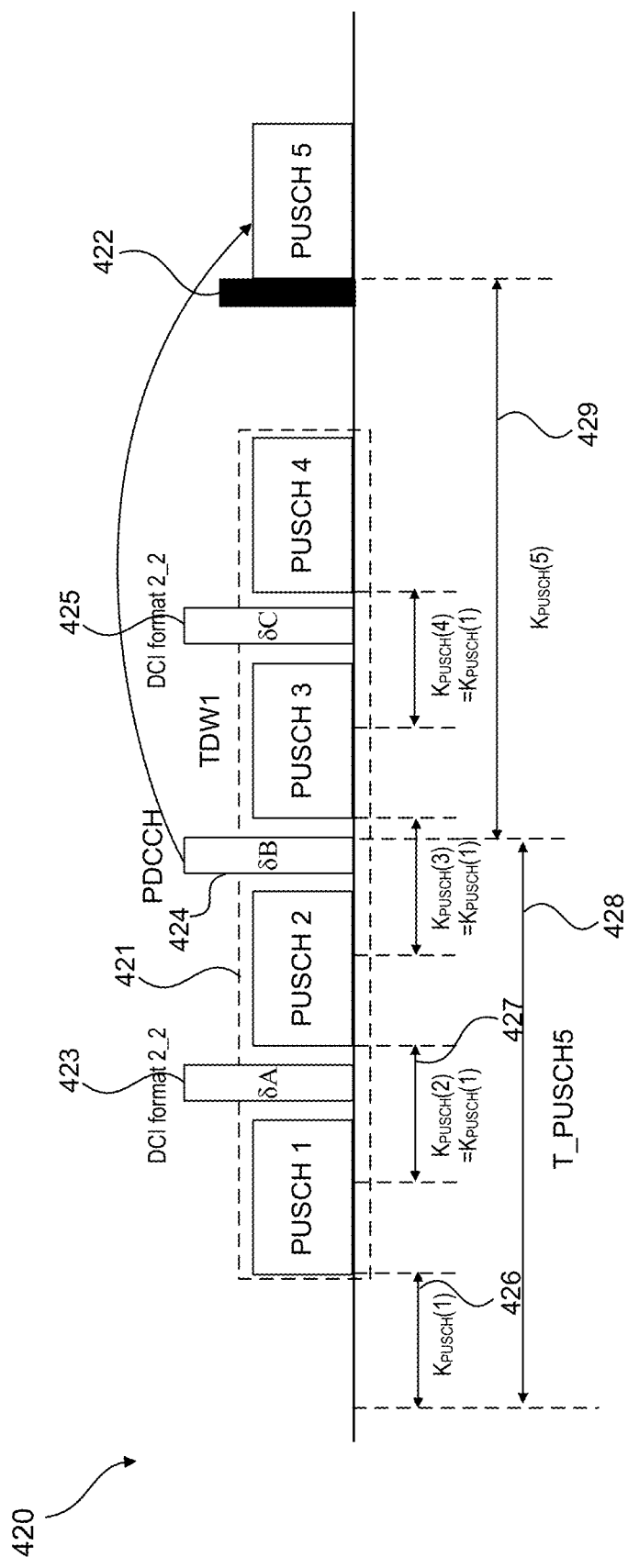

FIG. 4B shows example implementations performed by UE 101 for implementing a set of TPC commands during a TDW 421. TDW 421 includes PUSCH1, PUSCH2, PUSCH3, and PUSCH4. In some embodiments, PUSCH1, PUSCH2, PUSCH3, and PUSCH4 can be configured grant PUSCH, such as PUSCH configured grant type 1, without UL grant.

In some embodiments, a set of TPC commands can include a TPC command 423 ($\delta_A$), and a TPC command 425 ($\delta_C$), both are scheduled by a DCI for a group of UEs including UE 101. In some embodiments, TPC command 423 and TPC command 425 are scheduled by a DCI of DCI format 22 as a group common TPC command. In addition, the set of TPC commands can include a TPC command 424 ($\delta_B$), which is scheduled by a PDCCH for UE 101. The PDCCH can further schedule a PUSCH transmission, e.g., PUSCH5, which is scheduled after TDW 421 or out of TDW 421.

In some embodiments, UE 101 can be configured as the accumulate power control mode. The effective TPC command 422 for the set of TPC commands within TDW 421, which includes TPC command 423, TPC command 424, and TPC command 425, can be a new TPC command equivalent to an accumulation of all TPC commands in the set of TPC commands satisfying the time constraint.

In some embodiments, a timeline measurement 426 related to a PUSCH transmission can be denoted as $K_{PUSCH}(1)$, which is a time difference between a PUSCH transmission and a time instance configured by a configured grant of the PUSCH transmission. In addition, a timeline measurement 427 can be determined based on a separation between two adjacent PUSCH transmissions within the TDW, e.g., between PUSCH1 and PUSCH2, shown as $K_{PUSCH}(2)$. Similarly, $K_{PUSCH}(x)$ can be defined for x=3, 4. In some embodiments, $K_{PUSCH}(2)$, $K_{PUSCH}(3)$, and $K_{PUSCH}(4)$ can be equal to $K_{PUSCH}(1)$. In addition, a timeline measurement 429 can be determined based on a separation between the PDCCH containing TPC command 424 ($\delta_B$) and PUSCH5 transmission next to the PDCCH and scheduled by the PDCCH. The PDCCH may schedule more than one PUSCH, such as PUSCH5, and other PUSCH transmissions after PUSCH5, not shown. In addition, TDW 421 can include other PUSCH transmissions between the PDCCH and PUSCH5, such as PUSCH3 and PUSCH4, where PUSCH3 and PUSCH4 are not scheduled by the PDCCH.

In some embodiments, a time constraint can be shown as an accumulation window 428 based on timeline measurement 429. TPC command 423 and TPC command 424 satisfy the time constraint shown as accumulation window 428 based on timeline measurement 429. However, TPC command 425 is outside accumulation window 428 based on timeline measurement 429. Effective TPC command 422 for the set of TPC commands within TDW 421, which includes TPC command 423, TPC command 424, and TPC command 425, may be equivalent to an accumulation of TPC command 423 and TPC command 424 since only TPC command 423 and TPC command 424 satisfy the time constraint. Accordingly, for PUSCH transmission power determination, the $\delta_A$ and $\delta_B$ are applied, as both TPC commands are within the accumulation window, while $\delta_C$ is out of the window and could be applied in PUSCH after PUSCH 5, but not PUSCH5 itself.

Figure 4C:
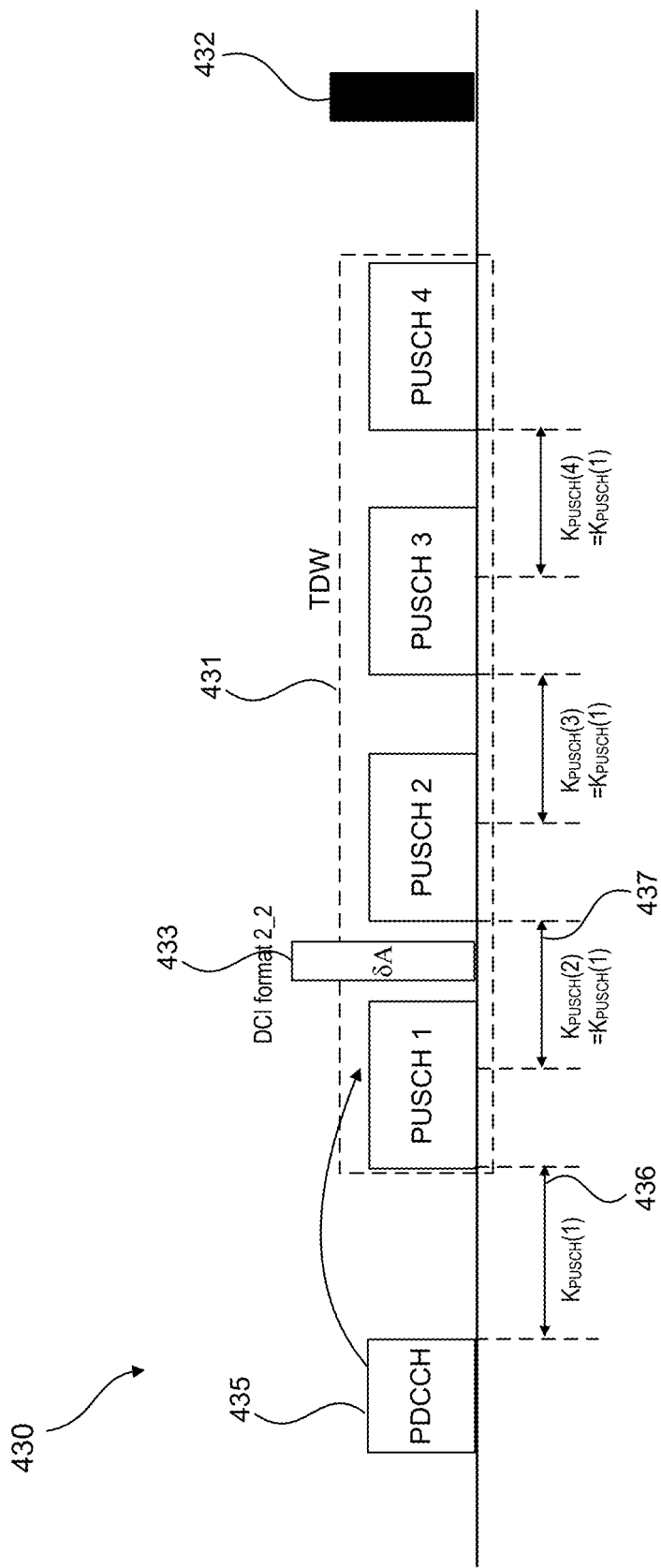

FIG. 4C shows example implementations performed by a UE for implementing a set of TPC commands during a TDW 431. TDW 431 includes PUSCH1, PUSCH2, PUSCH3, and PUSCH4. In some embodiments, PUSCH1, PUSCH2, PUSCH3, and PUSCH4 can be configured grant PUSCH, such as PUSCH configured grant type 2, with UL grant scheduled by a PDCCH 435. A set of TPC commands can include a TPC command 433 ($\delta_A$) scheduled by a DCI for a group of UEs including UE 101, such as by a DCI of DCI format 2_2. In some embodiments, UE 101 can be configured as the accumulate power control mode. An effective TPC command 432 for the set of TPC commands within TDW 431, which includes TPC command 433, can be a new TPC command equivalent to an accumulation of all TPC commands in the set of TPC commands satisfying the time constraint.

In some embodiments, a timeline measurement 436 related to a PUSCH transmission can be denoted as $K_{PUSCH}(1)$, which is a time difference between PUSCH1 transmission and PDCCH 435. $K_{PUSCH}(1)$ can be number of symbols after a last symbol of a corresponding PDCCH reception and before a first symbol of the PUSCH transmission. In addition, a timeline measurement 437 can be determined based on a separation between two adjacent PUSCH transmissions within the TDW, e.g., between PUSCH1 and PUSCH2, shown as $K_{PUSCH}(2)$. Similarly, $K_{PUSCH}(x)$ can be defined for x=3, 4. In some embodiments, $K_{PUSCH}(2)$, $K_{PUSCH}(3)$, and $K_{PUSCH}(4)$ can be equal to $K_{PUSCH}(1)$.

Figure 4D:
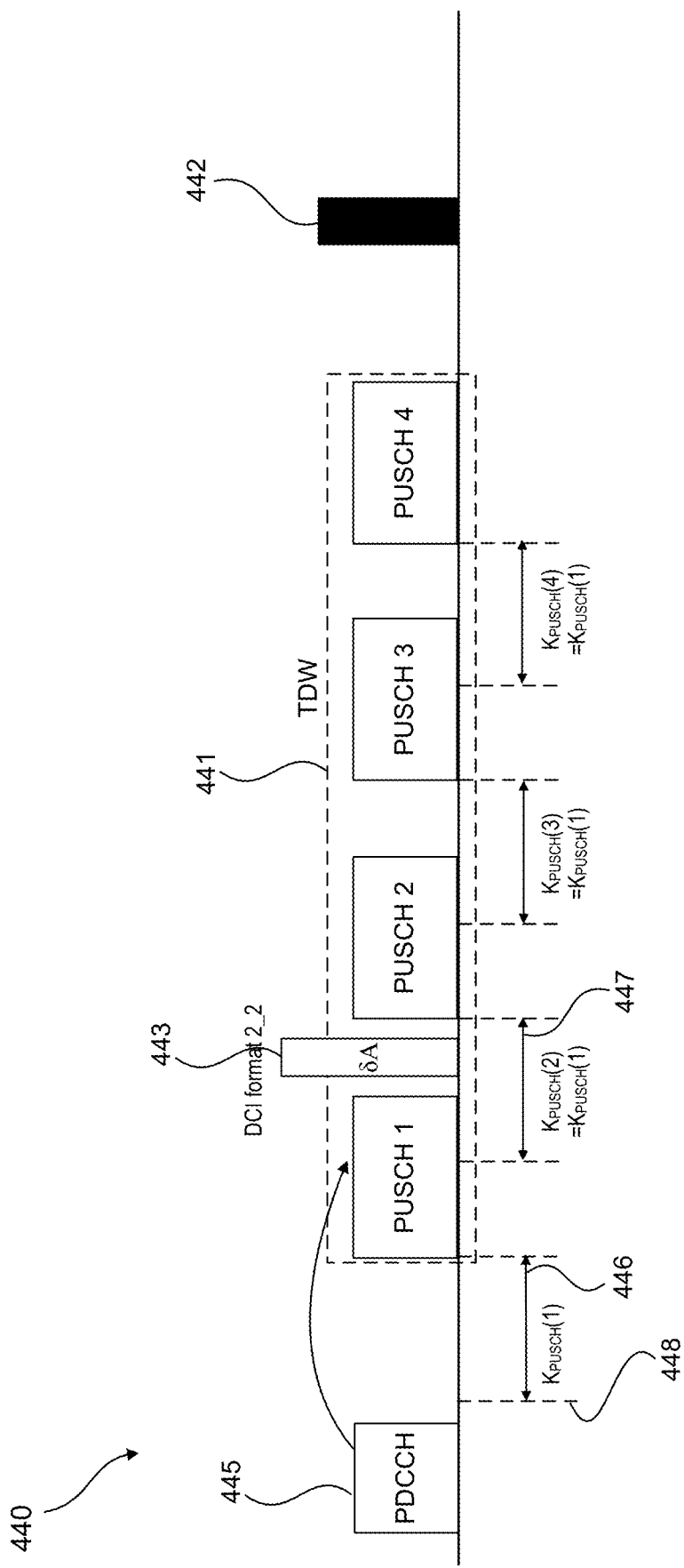

FIG. 4D shows example implementations performed by a UE for implementing a set of TPC commands during a TDW 441. TDW 441 includes PUSCH1, PUSCH2, PUSCH3, and PUSCH4. In some embodiments, PUSCH1, PUSCH2, PUSCH3, and PUSCH4 can be configured grant PUSCH, such as PUSCH configured grant type 2, with UL grant scheduled by a PDCCH 445. A set of TPC commands can include a TPC command 443 ($\delta^4$) scheduled by a DCI for a group of UEs including UE 101, such as by a DCI of DCI format 2_2. In some embodiments, UE 101 can be configured as the accumulate power control mode. An effective TPC command 442 for the set of TPC commands within TDW 441, which includes TPC command 443, can be a new TPC command equivalent to an accumulation of all TPC commands in the set of TPC commands satisfying the time constraint.

In some embodiments, a timeline measurement 446 related to a PUSCH transmission can be denoted as $K_{PUSCH}(1)$, which can be a time difference between PUSCH1 transmission and a time instance 448 configured by a configured grant. In some embodiments, $K_{PUSCH}(1)$ can be a number of $K_{PUSCH,\ min}$ symbols equal to a product of a number of symbols per slot such as 14, and a minimum of the values provided by K2 in PUSCH-ConfgCommon, e.g., $K_{PUSCH}(1)=K2*14$ symbols. In addition, a timeline measurement 447 can be determined based on a separation between two adjacent PUSCH transmissions within the TDW, e.g., between PUSCH1 and PUSCH2, shown as $K_{PUSCH}(2)$. Similarly, $K_{PUSCH}(x)$ can be defined for x=3, 4. In some embodiments, $K_{PUSCH}(2)$, $K_{PUSCH}(3)$, and $K_{PUSCH}(4)$ can be equal to $K_{PUSCH}(1)$.

Figure 4E:
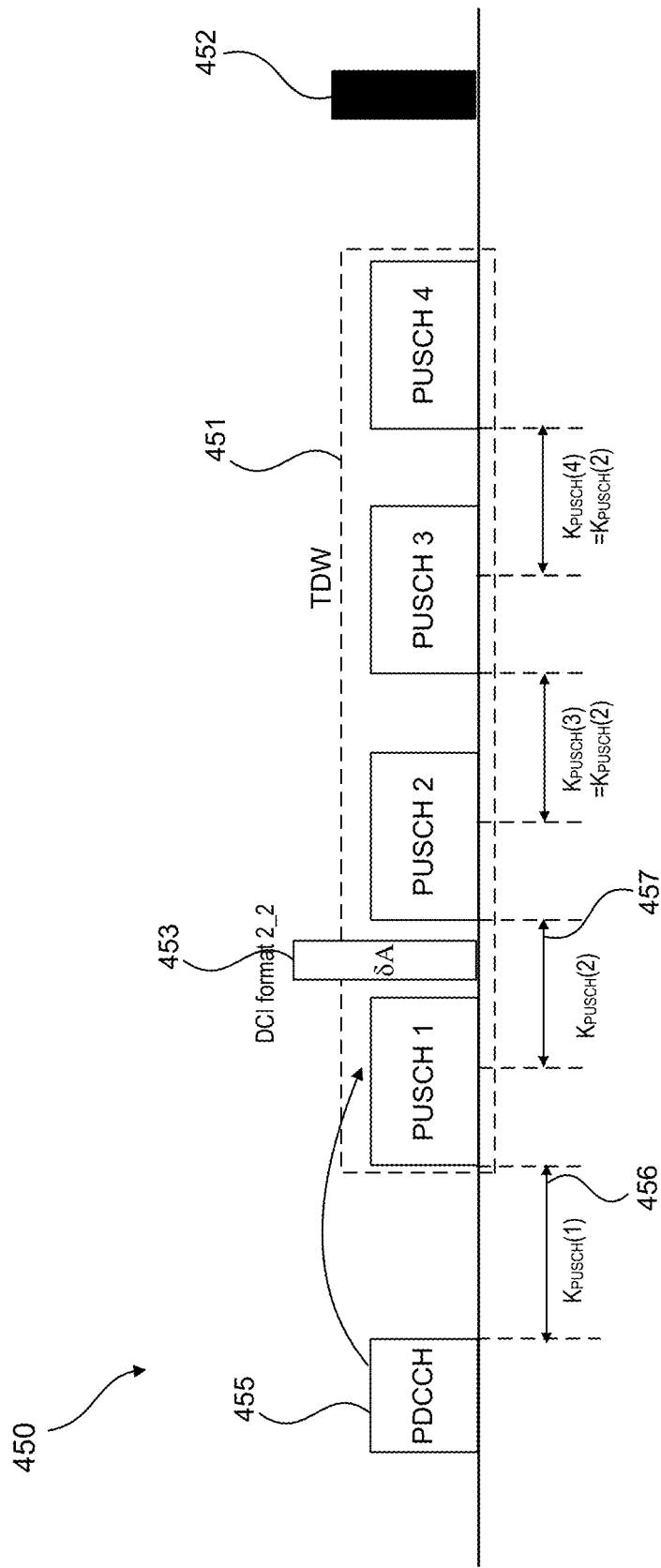

FIG. 4E shows example implementations performed by a UE for implementing a set of TPC commands during a TDW 451. TDW 451 includes PUSCH1, PUSCH2, PUSCH3, and PUSCH4. In some embodiments, PUSCH1, PUSCH2, PUSCH3, and PUSCH4 can be configured grant PUSCH, such as PUSCH configured grant type 2, with UL grant scheduled by a PDCCH 455. A set of TPC commands include a TPC command 453 ($\delta_A$) scheduled by a DCI for a group of UEs including UE 101, such as by a DCI of DCI format 2_2. In some embodiments, UE 101 can be configured as the accumulate power control mode. An effective TPC command 452 for the set of TPC commands within TDW 451, which includes TPC command 453, can be a new TPC command equivalent to an accumulation of all TPC commands in the set of TPC commands satisfying the time constraint.

In some embodiments, a timeline measurement 456 related to a PUSCH transmission can be denoted as $K_{PUSCH}(1)$, which is a time difference between PDCCH 455 and PUSCH1 transmission next to PDCCH 455 and scheduled by PDCCH 455. In detail, $K_{PUSCH}(1)$ can be a number of symbols after a last symbol of a corresponding PDCCH 455 reception and before a first symbol of the PUSCH1 transmission.

In addition, a timeline measurement 457 can be determined based on a separation between two adjacent PUSCH transmissions within the TDW, e.g., between PUSCH1 and PUSCH2, shown as $K_{PUSCH}(2)$. Similarly, $K_{PUSCH}(x)$ can be defined for x=3, 4. In some embodiments, $K_{PUSCH}(3)$, and $K_{PUSCH}(4)$ can be equal to $K_{PUSCH}(2)$, which may be different from $K_{PUSCH}(1)$. In some embodiments, $K_{PUSCH}(2)$ can be a number of $K_{PUSCH,min}$ symbols equal to a product of a number of symbols per slot such as 14, and a minimum of the values provided by K2 in PUSCH-Confg-Common, e.g., $K_{PUSCH}(2)=K2*14$ symbols.

Embodiments shown in FIGS. 4C, 4D, and 4E have different ways to configure the timeline measurement, which can be indicated by configuration 121. Configuration 121 can be configured by RRC signaling from base station 103 to indicate which case of FIGS. 4C, 4D, and 4E can be applied by UE 101. Furthermore, the different timeline measurement can lead to different effective delay for the effective TPC command as shown in FIGS. 4C-4E.

Figure 4F:
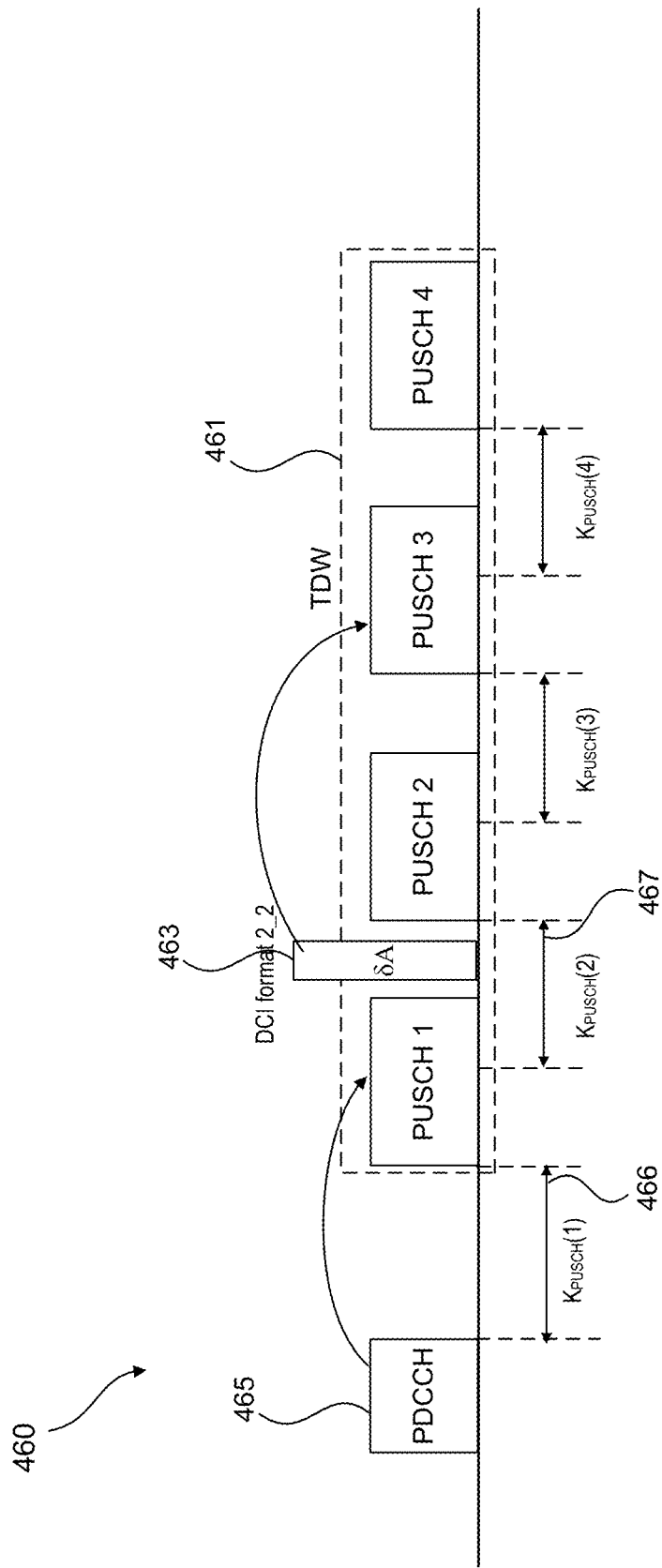

FIG. 4F shows example implementations performed by a UE for implementing a set of TPC commands during a TDW 461. TDW 461 includes PUSCH1, PUSCH2, PUSCH3, and PUSCH4. In some embodiments, PUSCH1, PUSCH2, PUSCH3, and PUSCH4 can be configured grant PUSCH, such as PUSCH configured grant type 2, with UL grant scheduled by a PDCCH 465. In some other embodiments, PUSCH1, PUSCH2, PUSCH3, and PUSCH4 can be configured grant PUSCH type 1, without UL grant. In some embodiments, UE 101 can be configured as the accumulate power control mode.

A set of TPC commands include a TPC command 463 ($\delta_A$) scheduled by a DCI for a group of UEs including UE 101, such as by a DCI of DCI format 2_2. For both PUSCH configured grant type 1 and type 2, if UE receives the group common TPC command, e.g., TPC command 463 ($\delta_A$), in TDW 461, UE 101 can consider it as an event which causes the transmission power insistency and phase discontinuity, thus the DMRS bundling is broken in TDW 461. TPC command 463 ($\delta_A$) is transmitted before the $K_{PUSCH}(3)$, hence TPC command 463 ($\delta_A$) can be applied to PUSCH3. TWD 461, which can be referred to as a nominal TWD at the slot, can be split into two actual TDWs, the first actual TDW including PUSCH1 and PUSCH2, and the second actual TDW including PUSCH3 and PUSCH4, where PUSCH3 and PUSCH4 in the second actual TDW is determined based on the TPC command 463 ($\delta_A$).

In some embodiments, a timeline measurement 466 related to a PUSCH transmission can be denoted as $K_{PUSCH}(1)$, which is a time difference between PDCCH 465 and PUSCH1 transmission next to PDCCH 465 and scheduled by PDCCH 465. In detail, timeline measurement 466 can be defined as the time difference between the last symbol of PDCCH 465 and the first symbol of PUSCH1.

In addition, a timeline measurement 467 can be determined based on a separation between two adjacent PUSCH transmissions within the TDW, e.g., between PUSCH1 and PUSCH2, shown as $K_{PUSCH}(2)$. Similarly, $K_{PUSCH}(x)$ can be defined for x=3, 4. In some embodiments, $K_{PUSCH}(3)$, and $K_{PUSCH}(4)$ can be equal to $K_{PUSCH}(2)$, which may be different from $K_{PUSCH}(1)$. In some embodiments, $K_{PUSCH}(2)$ can be a number of $K_{PUSCH,min}$ symbols equal to a product of a number of symbols per slot such as 14, and a minimum of the values provided by K2 in PUSCH-Confg-Common, e.g., $K_{PUSCH}(2)=K2*14$ symbols. Different ways to configure the timeline measurement, such as timeline measurement 466 or timeline measurement 467, can be indicated by configuration 121. Configuration 121 can be configured by RRC signaling from base station 103 to UE 101.

In some embodiments, there can be other ways to implement configuration 121 for UE 101. In some embodiments, PUSCH transmissions in a TDW can be scheduled by dynamic grant. The implementation of a set of TPC commands in such a TDW can be similar to the implementation of TPC commands in a configured TDW where PUSCH transmissions are configured instead of dynamically granted. If UE 101 receives a set of TPC commands in a TDW including PUSCH transmissions scheduled by dynamic grant, UE 101 can accumulate the set of TPC commands without taking effect during the current configured TDW. The set of TPC commands can take effect after the current configured TDW if the TPC command(s) satisfy the TPC application timeline of the first transmission after the TDW.

In some embodiments, UE 101 can report the capability of UE 101 for support UL power control. In some embodiments, UE 101 can determine and report to base station 103 that a group TPC command may not be applied to each PUSCH repetition, thus the PUSCH transmissions may keep the same power for all repetitions. In some other embodiments, UE 101 can report to base station 103 that UE 101 may have $K_{PUSCH}(1)$ to be applied for each PUSCH transmission as the timeline measurement. In some embodiments, $K_{PUSCH}(i)$ can be a number of $K_{PUSCH,min}$ symbols. Configuration 121 can be configured by RRC signaling from base station 103 to indicate what kind of timeline measurement, e.g., $K_{PUSCH}(1)$, or $K_{PUSCH}(i)$, is associated with the PUSCH repetitions.

In some embodiments, for PUSCH transmissions in a TDW scheduled by dynamic grant, a group common TPC command in the TDW can be considered as an event causing the transmission power inconsistency and phase discontinuity, thus DMRS bundling is broken. Accordingly, a set of group common TPC commands, which are scheduled by DCI format, can be similarly implemented within multiple actual TDWs within the TDW.

In some embodiments, for PUSCH transmissions in a TDW scheduled by dynamic grant or configured grant, with accumulate or absolute power control mode, UE 101 can report capability of applying group common TPC command during the DMRS bundling. If UE 101 doesn't support this capability, in some embodiments, UE 101 does not expect to receive the group common TPC command when performing DMRS bundling. It's up to base station 103 to determine whether group common TPC command is sent to UE 101. In case of base station 103 intends to get the DMRS bundling gain, no TPC command will be transmitted. In some embodiments, if base station 103 considers the transmission power adjustment is important and urgent, then a group common TPC command can be sent. UE 101 can adjust the transmission power according to the TPC command without maintaining the power consistency within the TDW.

In some embodiments, UE 101 can assume the value of a TPC command to be 0 dB in a group common TPC command. The accumulated TPC commands or last absolute TPC command can be applied to the PUSCH transmission after the repetitions. In some embodiments, when it is difficult to disable the TPC command transmission in DCI format 2_2 for a UE configured with DMRS bundling, UE 101 can assume the value of a TPC command to be 0 dB in a group common TPC command. In some embodiments, UE 101 can ignore or drop the group common TPC command, and UE 101 does not change the transmission power during the DMRS bundling.

In some embodiments, UE 101 can perform absolute power control with DMRS bundling and operate in the absolute power control mode. The latest TPC command that would take effect within a configured TDW supersedes all previous TPC commands that take effect within that configured TDW. Accordingly, only the last TPC command is applied by the UE after the current configured TDW if the TPC command satisfy the TPC application timeline of the first transmission after the TDW. If the following PUSCH transmission is scheduled by DCI, the dynamic grant scheduled PUSCH timeline can be applied to determine the number of symbols from PDCCH to PUSCH. If the following PUSCH transmission is another TDW, the timeline measurement can be determined by various mechanisms disclosed in the current description. In some embodiments, $K_{PUSCH}(2)$ can be a number of $K_{PUSCH, min}$ symbols.

Figure 5:
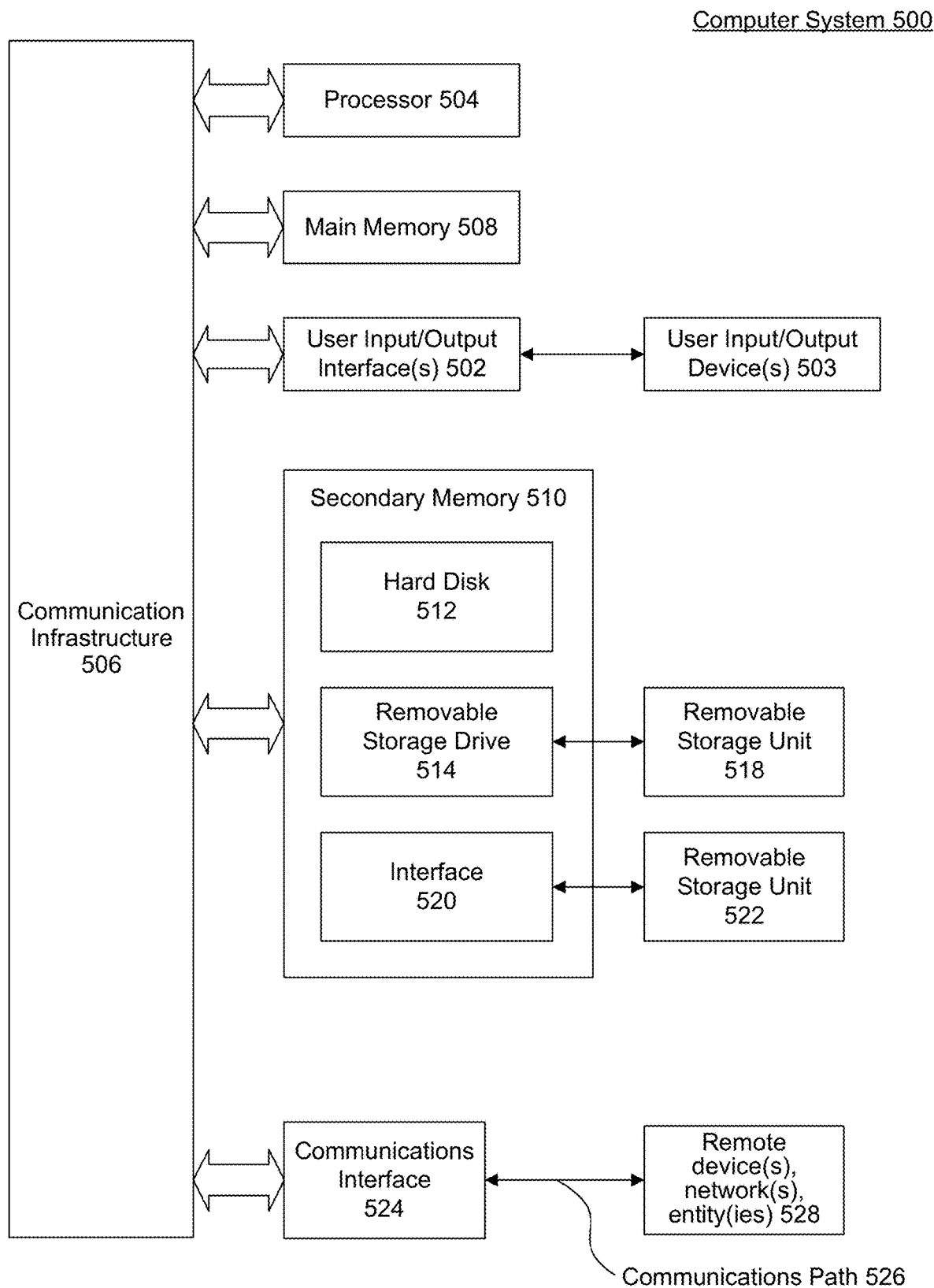
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the functions described herein such as UE 101, base station 103, or base station 105, as shown in FIG. 1 and FIG. 2, for operations described for processor 209 or process 300, and further illustrated in FIGS. 4A-4F. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or a base station, e.g., UE 101, base station 103, or base station 105, as shown in FIG. 1 and FIG. 2, for operations described for processor 209 or process 300, and further illustrated in FIGS. 4A-4F.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method of performing wireless communication by a user equipment (UE), comprising:
   receiving a configuration from a base station to configure the UE to support a power control mode and a timeline measurement related to a physical uplink shared channel (PUSCH) transmission;
   transmitting a first PUSCH transmission during a time domain window (TDW) that includes a plurality of PUSCH transmissions;
   receiving a set of transmit power control (TPC) commands during the TDW;
   determining whether a TPC command of the set of TPC commands satisfies a time constraint based on the timeline measurement;
   determining an effective TPC command for the set of TPC commands based on one or more TPC commands satisfying the time constraint;
   determining an effective delay for the effective TPC command based on the timeline measurement; and
   applying the effective TPC command to a second PUSCH transmission determined based on the effective delay of the effective TPC command.

2. The method of claim 1, wherein the set of TPC commands includes a TPC command scheduled by a downlink control information (DCI) for a group of UEs including the UE, or a TPC command scheduled by a physical downlink control channel (PDCCH) for the UE.

3. The method of claim 1, wherein the timeline measurement is determined based on a separation between two adjacent PUSCH transmissions within the TDW, between a physical downlink control channel (PDCCH) and a PUSCH transmission next to the PDCCH and scheduled by the PDCCH, or between a PUSCH transmission and a time instance configured by a configured grant of the PUSCH transmission.

4. The method of claim 1, wherein the power control mode is configured as an accumulate power control mode or an absolute power control mode.

5. The method of claim 4, wherein the power control mode is configured as the accumulate power control mode, the effective TPC command includes an accumulation of all TPC commands in the set of TPC commands satisfying the time constraint, the second PUSCH transmission is within a subsequent TDW after the TDW, and a first timeline measurement related to the first PUSCH transmission within the TDW and a second timeline measurement related to the second PUSCH transmission within the subsequent TDW have a same value.

6. The method of claim 4, wherein the power control mode is configured as the accumulate power control mode, the TPC command is scheduled by a physical downlink control channel (PDCCH) for the UE, the first PUSCH transmission is of configured grant type without uplink grant, the second PUSCH transmission is outside the TDW, a first timeline measurement related to the first PUSCH transmission within the TDW and a third timeline measurement related to a third PUSCH transmission within the TDW have a same value, a second timeline measurement related to the second PUSCH transmission is determined by the PDCCH scheduling the second PUSCH transmission, and the effective TPC command includes an accumulation of all TPC commands in the set of TPC commands satisfying the time constraint based on the second timeline measurement.

7. The method of claim 4, wherein the power control mode is configured as the accumulate power control mode, the TPC command is scheduled by a downlink control information (DCI) for a group of UEs including the UE, the first PUSCH transmission is of a configured grant type, the first PUSCH transmission is in a first actual TDW, the second PUSCH transmission is in a second actual TDW within the TDW, and a first timeline measurement related to the first PUSCH transmission within the first actual TDW and a second timeline measurement related to the second PUSCH transmission within the second actual TDW have a same value.

8. The method of claim 4, wherein the power control mode is configured as the accumulate power control mode, the first PUSCH transmission is of a dynamic grant, the effective TPC command for the set of TPC commands includes an accumulation of all TPC commands in the set of TPC commands satisfying the time constraint, the second PUSCH transmission is outside the TDW, and a first timeline measurement related to the first PUSCH transmission within the TDW and a second timeline measurement related to the second PUSCH transmission outside the TDW have a same value.

9. The method of claim 4, wherein the power control mode is configured as the accumulate power control mode or the absolute power control mode, the TPC command is scheduled by a downlink control information (DCI) for a group of UEs including the UE, and the effective TPC command for the set of TPC commands is determined considering the DCI scheduled TPC command.

10. The method of claim 4, wherein the power control mode is configured as the absolute power control mode, the effective TPC command includes a TPC command of the set of TPC commands received at a latest time and satisfying the time constraint, and the second PUSCH transmission is outside the TDW.

11. The method of claim 4, wherein the power control mode is configured as the accumulate power control mode or the absolute power control mode, the TPC command is scheduled by a downlink control information (DCI) for a group of UEs including the UE, and the TPC command is not applied to the first PUSCH transmission or the second PUSCH transmission.

12. The method of claim 1, further comprising:
reporting to the base station a capability of the UE in supporting the timeline measurement related to a PUSCH transmission.

13. A user equipment (UE), comprising:
a transceiver configured to enable wireless communication over a wireless network with a base station; and
a processor communicatively coupled to the transceiver and configured to:
receive a configuration from the base station to configure the UE to support a power control mode and a timeline measurement related to a physical uplink shared channel (PUSCH) transmission;
transmit a first PUSCH transmission during a time domain window (TDW) that includes a plurality of PUSCH transmissions;
receive a set of transmit power control (TPC) commands during the TDW;
determine whether a TPC command of the set of TPC commands satisfies a time constraint based on the timeline measurement;
determine an effective TPC command for the set of TPC commands based on one or more TPC commands satisfying the time constraint;
determine an effective delay for the effective TPC command based on the timeline measurement; and
apply the effective TPC command to a second PUSCH transmission determined based on the effective delay of the effective TPC command.

14. The UE of claim 13, wherein the timeline measurement is determined based on a separation between two adjacent PUSCH transmissions within the TDW, between a physical downlink control channel (PDCCH) and a PUSCH transmission next to the PDCCH and scheduled by the PDCCH, or between a PUSCH transmission and a time instance configured by a configured grant of the PUSCH transmission.

15. The UE of claim 13, wherein the power control mode is configured as an accumulate power control mode or an absolute power control mode.

16. The UE of claim 15, wherein the power control mode is configured as the accumulate power control mode, the effective TPC command includes a new TPC command equivalent to an accumulation of all TPC commands in the set of TPC commands satisfying the time constraint, and the second PUSCH transmission is within a subsequent TDW after the TDW.

17. The UE of claim 15, wherein the power control mode is configured as the accumulate power control mode, the TPC command is scheduled by a downlink control information (DCI) for a group of UEs including the UE, the first PUSCH transmission is of a configured grant type, the first PUSCH transmission is in a first actual TDW, and the second PUSCH transmission is in a second actual TDW within the TDW.

18. The UE of claim 15, wherein the power control mode is configured as the accumulate power control mode, the first PUSCH transmission is of a dynamic grant type, the effective TPC command for the set of TPC commands includes a new TPC command equivalent to an accumulation of all TPC commands in the set of TPC commands satisfying the time constraint, and the second PUSCH transmission is outside the TDW.

19. A non-transitory computer-readable medium storing instructions that, when executed by a processor of a user equipment (UE), cause the UE to perform operations, the operations comprising:
receiving a configuration from a base station to configure the UE to support a power control mode and a timeline measurement related to a physical uplink shared channel (PUSCH) transmission;
transmitting a first PUSCH transmission during a time domain window (TDW) that includes a plurality of PUSCH transmissions;
receiving a set of transmit power control (TPC) commands during the TDW;
determining whether a TPC command of the set of TPC commands satisfies a time constraint based on the timeline measurement;
determining an effective TPC command for the set of TPC commands based on one or more TPC commands satisfying the time constraint;
determining an effective delay for the effective TPC command based on the timeline measurement; and
applying the effective TPC command to a second PUSCH transmission determined based on the effective delay of the effective TPC command.

20. The non-transitory computer-readable medium of claim 19, wherein the set of TPC commands includes a TPC command scheduled by a downlink control information (DCI) for a group of UEs including the UE, or a TPC command scheduled by a physical downlink control channel (PDCCH) for the UE.

* * * * *

UNITED STATES PATENT AND TRADEMARK OFFICE
CERTIFICATE OF CORRECTION

PATENT NO. : 12,490,258 B2
APPLICATION NO. : 18/124449
DATED : December 2, 2025
INVENTOR(S) : Yao et al.

Page 1 of 1

It is certified that error appears in the above-identified patent and that said Letters Patent is hereby corrected as shown below:

In the Specification

In Column 8, Line 28, delete "$K_{PUSCH}$, min" and insert -- $K_{PUSCH, min}$ --.

In Column 9, Line 1, delete "22" and insert -- 2_2 --.

In Column 10, Line 20, delete "($\delta^A$)" and insert -- ($\delta_A$) --.

In Column 10, Line 34, delete "$K_{PUSCH}$, min" and insert -- $K_{PUSCH, min}$ --.

In Column 11, Line 8, delete "$K_{PUSCH}$, min" and insert -- $K_{PUSCH, min}$ --.

In Column 11, Line 62, delete "$K_{PUSCH}$, min" and insert -- $K_{PUSCH, min}$ --.

In Column 12, Line 27, delete "$K_{PUSCH}$, min" and insert -- $K_{PUSCH, min}$ --.

In Column 13, Line 16, delete "$K_{PUSCH}$, min" and insert -- $K_{PUSCH, min}$ --.

In Column 13, Line 49, delete "and/any" and insert -- and/or any --.

Signed and Sealed this
Sixth Day of January, 2026

John A. Squires
*Director of the United States Patent and Trademark Office*